(12) United States Patent
Butlin, Jr. et al.

(10) Patent No.: US 9,233,713 B2
(45) Date of Patent: Jan. 12, 2016

(54) ADJUSTABLE TOE CURVE KNUCKLE FOR A VEHICLE SUSPENSION AND METHOD

(71) Applicant: GM GLOBAL TECHNOLOGY OPERATIONS LLC, Detroit, MI (US)

(72) Inventors: Albert H. Butlin, Jr., Beverly Hills, MI (US); Paul R. Messina, West Bloomfield, MI (US); Edward J. Miller, Flushing, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 0 days.

(21) Appl. No.: 14/304,245

(22) Filed: Jun. 13, 2014

(65) Prior Publication Data

US 2015/0360722 A1    Dec. 17, 2015

(51) Int. Cl.
*B62D 17/00* (2006.01)
*B62D 7/18* (2006.01)

(52) U.S. Cl.
CPC ........ *B62D 17/00* (2013.01); *B62D 7/18* (2013.01); *B60G 2200/462* (2013.01); *B60G 2200/4622* (2013.01)

(58) Field of Classification Search
CPC combination set(s) only.
See application file for complete search history.

(56) References Cited

U.S. PATENT DOCUMENTS

| | | | | |
|---|---|---|---|---|
| 1,378,783 | A * | 5/1921 | Griffeth | 403/149 |
| 1,946,858 | A * | 2/1934 | Kahle et al. | 280/86.751 |
| 2,096,118 | A * | 10/1937 | Leighton | 267/222 |
| 3,771,813 | A * | 11/1973 | Stotz | 280/124.127 |
| 3,833,235 | A * | 9/1974 | Worsham | 280/89.1 |
| 3,840,211 | A * | 10/1974 | Castoe | 254/131 |
| 4,194,760 | A * | 3/1980 | Shiomi et al. | 280/86.753 |
| 4,616,845 | A * | 10/1986 | Pettibone | 280/86.753 |
| 4,695,073 | A * | 9/1987 | Pettibone et al. | 280/86.757 |
| 4,844,505 | A * | 7/1989 | Higuchi | 280/124.145 |
| 5,060,962 | A * | 10/1991 | McWethy | 280/304.1 |
| 5,129,669 | A * | 7/1992 | Specktor et al. | 280/86.753 |
| 5,549,319 | A * | 8/1996 | Kring | 280/86.75 |
| 5,622,378 | A * | 4/1997 | Schlosser et al. | 280/86.753 |
| 5,647,606 | A * | 7/1997 | Jordan | 280/86.751 |
| 5,931,485 | A * | 8/1999 | Modinger et al. | 280/86.751 |
| 6,029,985 | A * | 2/2000 | Lundy | 280/86.753 |
| 6,367,826 | B1 * | 4/2002 | Klais | 280/86.751 |
| 6,374,665 | B1 * | 4/2002 | Somppi et al. | 73/146 |
| 6,431,659 | B1 * | 8/2002 | Somppi | 301/132 |
| 7,117,599 | B2 * | 10/2006 | Sadanowicz et al. | 29/894.361 |
| 7,210,693 | B2 * | 5/2007 | Ingalls et | 280/86.756 |
| 8,226,091 | B2 * | 7/2012 | Lee | 280/5.52 |
| 8,469,371 | B1 * | 6/2013 | Lee et al. | 280/5.52 |
| 8,469,375 | B2 * | 6/2013 | Frens | 280/86.753 |
| 8,480,107 | B2 * | 7/2013 | Henksmeier et al. | 280/124.128 |
| 8,746,714 | B2 * | 6/2014 | Frens | 280/86.757 |
| 8,870,205 | B2 * | 10/2014 | Corby et al. | 280/124.134 |

FOREIGN PATENT DOCUMENTS

| | | | |
|---|---|---|---|
| DE | 102013207910 A1 | * | 10/2014 |
| EP | 2495116 A2 | * | 9/2012 |
| FR | 2982531 A1 | * | 5/2013 |

\* cited by examiner

*Primary Examiner* — Nicole Verley

(74) *Attorney, Agent, or Firm* — Quinn Law Group, PLLC

(57) ABSTRACT

An adjustable knuckle/steer arm assembly and method for adjusting a toe curve setting of a vehicle wheel is provided. The adjustable knuckle/steer arm assembly includes a knuckle and a steer arm. The steer arm is pivotally connected to the knuckle at a pivot. One of the knuckle and the steer arm has a slot formed therein and the other has a connector member which engages the slot. The steer arm is angularly adjustable with respect to the knuckle via adjustable engagement of the connector member along the slot to enable the toe curve setting to be adjusted.

14 Claims, 3 Drawing Sheets

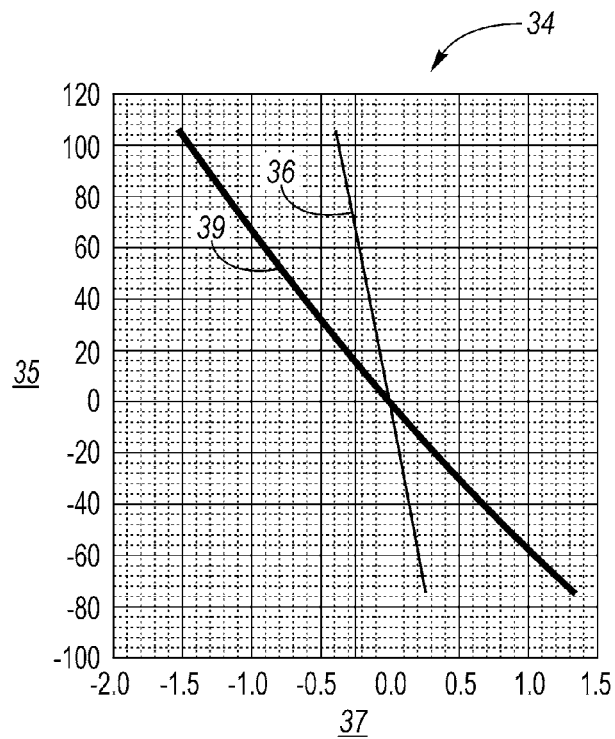
FIG. 3
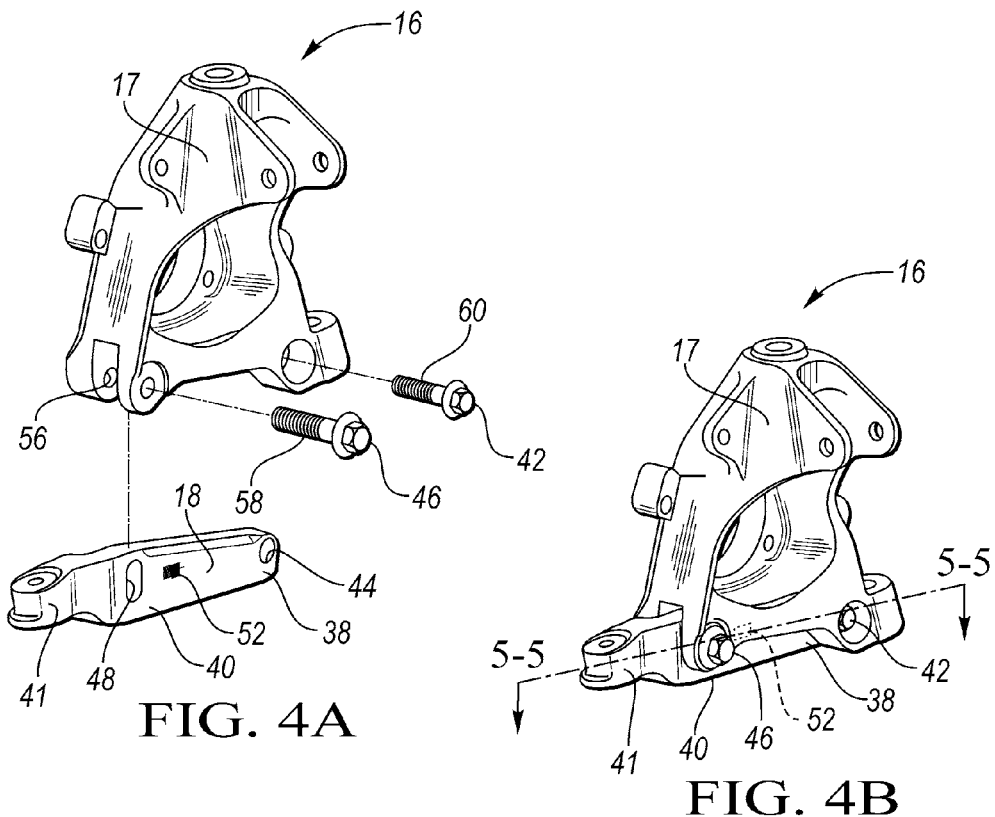
FIG. 4A
FIG. 4B

ADJUSTABLE TOE CURVE KNUCKLE FOR A VEHICLE SUSPENSION AND METHOD

TECHNICAL FIELD

This disclosure for a vehicle suspension relates to an adjustable knuckle/steer arm assembly for adjusting a toe curve setting for a vehicle wheel.

BACKGROUND

Vehicle suspensions typically have a variety of designed-in and/or adjustable settings, including caster, camber, and toe angle. These settings affect vehicle handling characteristics, such as cornering. Due to vehicle suspension geometry, toe angle typically varies with vertical wheel travel. Vertical wheel travel is affected by vehicle maneuvering, acceleration, deceleration, braking, loading, road, and other conditions. Wheel toe angle changes as the vertical wheel travel changes due to these conditions. Toe curve is the relationship between vertical wheel travel and wheel toe angle. It is desirable to be able to quickly and easily adjust toe curve settings for high performance vehicles and for development of suspension settings for all vehicles.

SUMMARY

An adjustable knuckle/steer arm assembly for adjusting a toe curve setting of a vehicle wheel is provided. The adjustable knuckle/steer arm assembly includes a knuckle and a steer arm. The steer arm is pivotally connected to the knuckle at a pivot. One of the knuckle and the steer arm has a slot formed therein and the other has a connector member which engages the slot. The steer arm is angularly adjustable with respect to the knuckle via adjustable engagement of the connector member along the slot to enable the toe curve setting to be adjusted.

A vehicle having a suspension including and adjustable knuckle/steer arm assembly is also provided. The vehicle includes a wheel, a tie rod, a knuckle, and a steer arm. The knuckle is connected to the wheel. The steer arm is connected to the tie rod and pivotally connected to the knuckle at a pivot. One of the knuckle and the steer arm has a slot formed therein and the other has a connector member which engages the slot. The steer arm is angularly adjustable with respect to the knuckle via adjustable engagement of the connector member along the slot to enable a toe curve setting for the wheel to be adjusted.

A method to adjust a toe curve setting of a vehicle suspension is also provided. The method includes mounting a steer arm to a knuckle via a pivot to form an adjustable knuckle/steer arm assembly, and pivoting the steer arm with respect to the knuckle on the pivot to adjust a position of the steer arm with respect to the knuckle to enable the toe curve setting to be adjusted.

The provided adjustable knuckle/steer arm assembly, vehicle, and method enable quick and easy adjustment of toe curve settings for high performance vehicles and for development of suspensions for all vehicles.

The above features and advantages and other features and advantages of the present teachings are readily apparent from the following detailed description of the best modes for carrying out the present teachings when taken in connection with the accompanying drawings.

BRIEF DESCRIPTION OF THE DRAWINGS

FIG. 3 is a toe curve graph, showing vertical wheel travel versus wheel toe angle for two different toe curve settings of the rear suspension with the adjustable knuckle/steer arm assembly of FIG. 1;

FIG. 4A is a schematic perspective exploded illustration of the adjustable knuckle/steer arm assembly of FIG. 1;

FIG. 4B is a schematic perspective illustration of the adjustable knuckle/steer arm assembly of FIG. 1;

DETAILED DESCRIPTION

Figure 1:
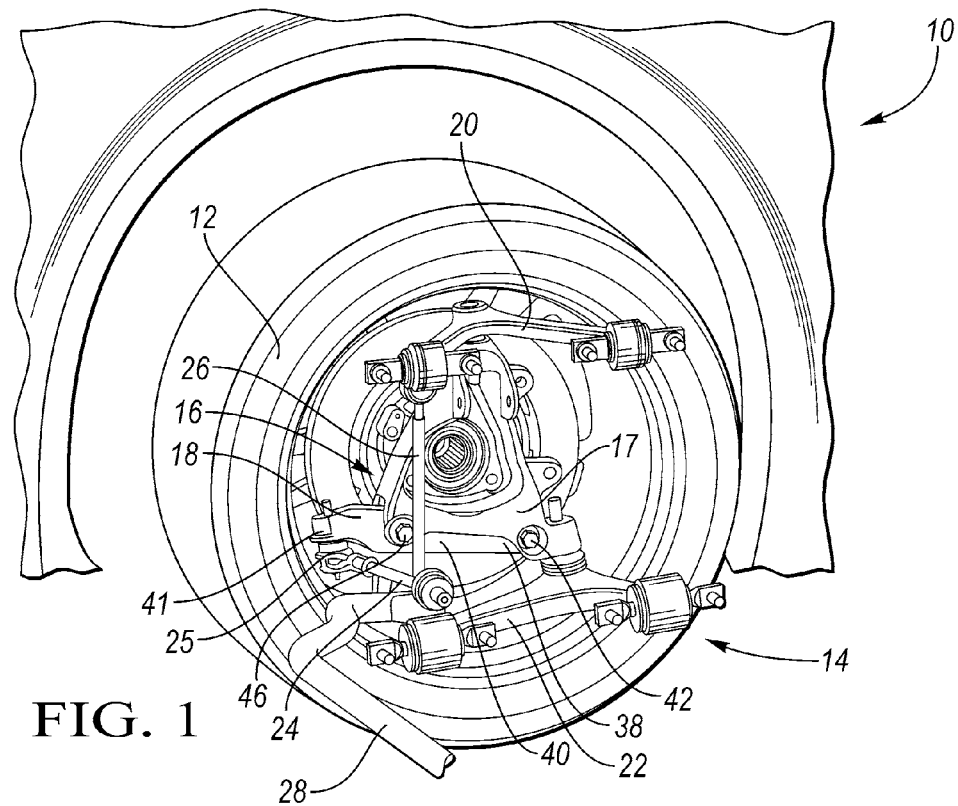
FIG. 1 is a fragmentary schematic perspective illustration from the inside of a vehicle, showing a rear suspension with an adjustable knuckle/steer arm assembly for adjusting a toe curve setting, with the spring, shock absorber, and other suspension components removed for clarity.

Referring to the drawings, wherein like reference numbers refer to like components throughout the views, FIG. 1 shows a vehicle 10 having a wheel 12 and a suspension 14. The vehicle suspension 14 includes an adjustable knuckle/steer arm assembly 16, to be described in detail below. The suspension 14 may also include an upper control arm 20, a lower control arm 22, a tie rod 24, a drop link 26, and a stabilizer bar 28. The adjustable knuckle/steer arm assembly 16 may be operatively connected to the upper control arm 20, the lower control arm 22, the tie rod 24, and the drop link 26. The tie rod 24 may be connected to the adjustable knuckle/steer arm assembly 16 via a tie rod outer ball joint 25. The drop link 26 may be operatively connected to the stabilizer bar 28. The upper control arm 20, the lower control arm 22, the tie rod 24 and the stabilizer bar 28 may also be operatively connected to the vehicle 10.

Figure 2:
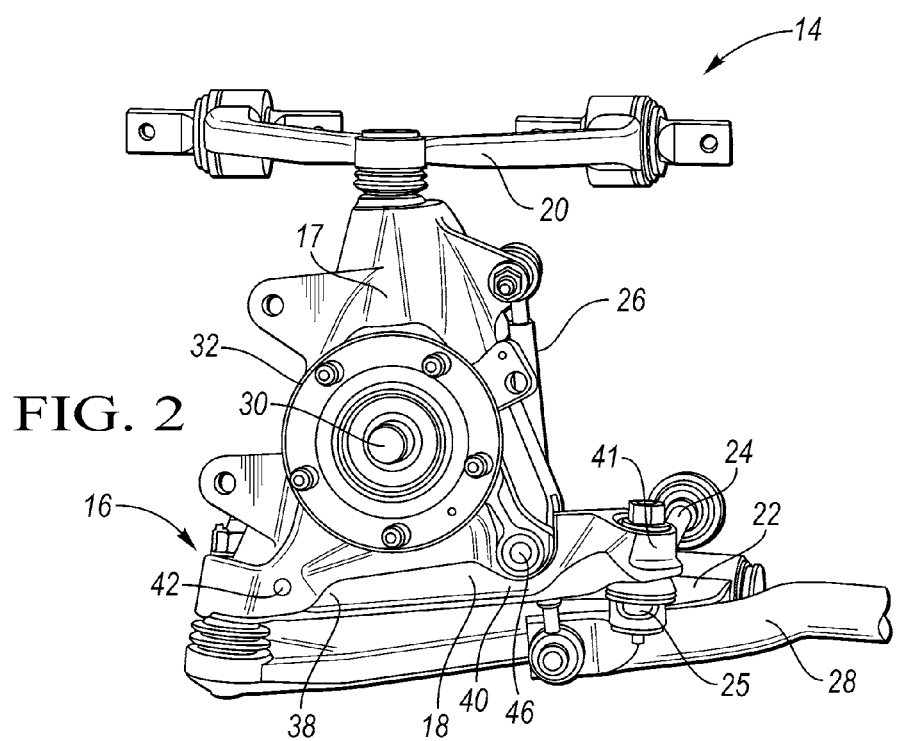
FIG. 2 is a schematic perspective illustration from the outside of the rear suspension with the adjustable knuckle/steer arm assembly of FIG. 1, with the wheel, brake, and other suspension components removed for clarity.

Referring now to FIG. 2, a wheel bearing assembly 32 is attached to the adjustable knuckle/steer arm assembly 16. An axle 30 is rotatably attached to the wheel bearing assembly 32. The wheel 12, shown in FIG. 1, is fastened to the axle 30. Although FIGS. 1 and 2 show a rear suspension, this suspension configuration or a similar suspension configuration, which includes the adjustable knuckle/steer arm assembly 16, may also be used in a front suspension. In addition, other suspension configurations with more, less, or different suspension components may include the adjustable knuckle/steer arm assembly 16.

Referring generally to FIGS. 1 and 2, the adjustable knuckle/steer arm assembly 16 includes a knuckle 17 and a steer arm 18. The steer arm 18 is pivotally connected to the knuckle at a pivot 42. One of the knuckle 17 and the steer arm 18 has a slot 48 formed therein and the other has a connector member 46 which engages the slot 48. The steer arm 18 is angularly adjustable with respect to the knuckle 17 via adjustable engagement of the connector member 46 along the slot 48 to enable a toe curve setting 36, as shown in FIG. 3, to be adjusted, without affecting other suspension static design factors (i.e. camber curves, trail, anti lift/dive, roll center height, etc.). Angularly adjustable is defined as the ability to change an angular position of the steer arm 18 relative to the knuckle 17 by rotating the steer arm 18 relative to the knuckle 17 about the pivot 42.

Referring now to FIG. 3, a toe curve graph 34 depicts vertical wheel travel 35 versus wheel toe angle 37. For example, the toe curve setting 36 and another toe curve setting 39 are shown in the toe curve graph 34. The vertical wheel travel 35 may result from vehicle maneuvering, acceleration, deceleration, braking, loading, road, and other conditions. The wheel toe angle 37 changes as the vertical wheel travel 35 changes due to these conditions. The toe curve setting 36 may be adjusted by positioning the steer arm 18 with respect to the knuckle 17. For example, adjusting the position of the steer arm 18 with respect to the knuckle 17 may change the toe curve setting 36 to another toe curve setting 39.

Referring now to FIGS. 4A and 4B, the steer arm 18 may have a proximate portion 38, an intermediate portion 40, and a distal portion 41. The proximate portion 38 may form a hole 44. The intermediate portion 40 may form the slot 48, and the distal portion 41 may be attachable to the tie rod 24 of the vehicle suspension 14 via the tie rod outer ball joint 25 (as best shown in FIG. 1). The pivot 42 may be a first bolt 42, as shown, connected with the hole 44. The connector member 46 may be a second bolt 46, as shown, through the slot 48.

The angular position of the steer arm 18 with respect to the knuckle 17 may be selectively adjustable over a predetermined range of angular positions. One of the knuckle 17 and the steer arm 18 may have a scale 52 for determining the angular position of the steer arm 18 with respect to the knuckle 17. The scale 52 may be a vernier scale.

Figure 5:
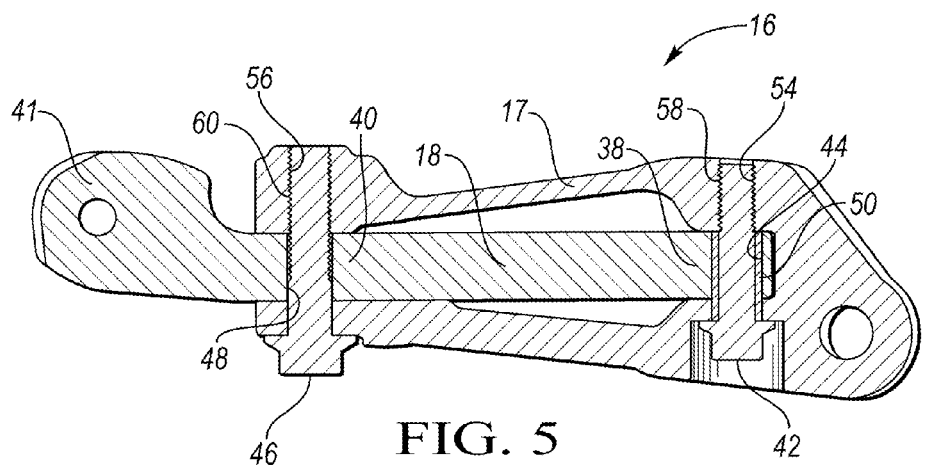
FIG. 5 is a schematic cross sectional illustration taken at lines 5-5 in FIG. 4B of the adjustable knuckle/steer arm assembly of FIG. 4B.

Referring now to FIG. 5, the adjustable knuckle/steer arm assembly 16 may include a sleeve 50 disposed between the steer arm 18 and the pivot 42. The knuckle 17 may have threads 54 and threads 56. The first bolt 42 may have threads 58. The first bolt threads 42 and may be engaged in the knuckle threads 54 to fasten the steer arm 18 to the knuckle 17. The second bolt 46 may have threads 60. The second bolt threads 60 may be engaged in the knuckle threads 56 to fasten the steer arm 18 to the knuckle 17.

Figure 6:
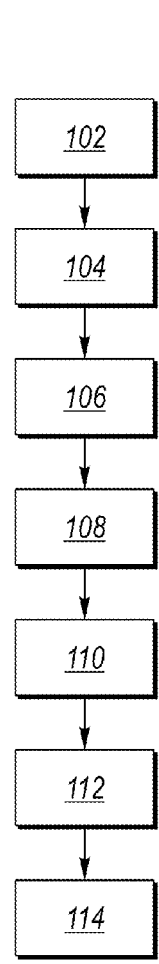
FIG. 6 is a flow chart of a method to adjust the toe curve setting of a vehicle suspension with the adjustable knuckle/steer arm assembly of FIG. 1.

Referring now to FIG. 6, a method 100 to adjust a toe curve setting 36, 39 of a vehicle suspension 14 is shown. The method includes mounting 102 a steer arm 18 to a knuckle 17 via a pivot 42 to form an adjustable knuckle/steer arm assembly 16, and pivoting 106 the steer arm 18 with respect to the knuckle 17 on the pivot 42 to adjust a position of the steer arm 18 with respect to the knuckle 17 to enable the toe curve setting 36, 39 to be adjusted.

Pivoting 106 may include adjusting the position of the steer arm 18 with respect to the knuckle 17 within a predetermined range of positions. Pivoting 106 may include adjusting the position of the steer arm 18 with respect to the knuckle 17 in predetermined measurable increments to vary the toe curve setting 36, 39 within a predetermined range of toe curve settings.

The method 100 may include measuring 108 the position of the steer arm 18 with respect to the knuckle 17 to determine an adjusted position of the steer arm 18 with respect to the knuckle 17. The method 100 may include selecting 104 predetermined positions of the steer arm 18 with respect to the knuckle 17 as the steer arm 18 is pivoted, recording 110 the position of the steer arm 18 with respect to the knuckle 17 at each of the predetermined positions, and recording 112 the toe curve setting 36, 39 for each of the respective recorded positions so that a selection of toe curve settings 36, 39 may be achieved. The method 100 may include pivoting 114 the steer arm 18 with respect to the knuckle 17 to a selected one of the predetermined positions whereby to select a desired toe curve setting 36, 39 from the selection of toe curve settings.

While the best modes for carrying out the many aspects of the present teachings have been described in detail, those familiar with the art to which these teachings relate will recognize various alternative aspects for practicing the present teachings that are within the scope of the appended claims.

The invention claimed is:

1. An adjustable knuckle/steer arm assembly for adjusting a toe curve setting for a wheel of a vehicle having a suspension, comprising:
    a knuckle connectable to the wheel; and
    a steer arm pivotally connected to the knuckle at a pivot and connectable to a tie rod of the suspension;
    wherein one of the knuckle and the steer arm has a slot formed therein and the other has a connector member which engages the slot; and
    wherein the steer arm is angularly adjustable with respect to the knuckle via adjustable engagement of the connector member along the slot to enable the toe curve setting for the wheel to be adjusted.

2. The adjustable knuckle/steer arm assembly of claim 1, wherein the steer arm has a proximate portion, an intermediate portion, and a distal portion; and wherein the proximate portion forms a hole, the intermediate portion forms the slot, and the distal portion is attachable to a tie rod of a vehicle suspension.

3. The adjustable knuckle/steer arm assembly of claim 2, wherein the pivot is a first bolt connected with the hole and the connector member is a second bolt.

4. The adjustable knuckle/steer arm assembly of claim 3, further comprising a sleeve disposed between the steer arm and the first bolt.

5. The adjustable knuckle/steer arm assembly of claim 1, wherein an angular position of the steer arm with respect to the knuckle is selectively adjustable over a predetermined range of angular positions.

6. The adjustable knuckle/steer arm assembly of claim 5, wherein one of the knuckle and the steer arm has a scale for determining the angular position of the steer arm with respect to the knuckle.

7. The adjustable knuckle/steer arm assembly of claim 6, wherein the scale is a vernier scale.

8. A vehicle having a suspension including an adjustable knuckle/steer arm assembly, comprising:
    a wheel;
    a tie rod of the suspension;
    a knuckle connected to the wheel; and
    a steer arm connected to the tie rod and pivotally connected to the knuckle at a pivot;
    wherein one of the knuckle and the steer arm has a slot formed therein and the other has a connector member which engages the slot; and
    wherein the steer arm is angularly adjustable with respect to the knuckle via adjustable engagement of the connector member along the slot to enable a toe curve setting for the wheel to be adjusted.

9. The vehicle of claim 8, wherein the steer arm has a proximate portion, an intermediate portion, and a distal portion; and wherein the proximate portion forms a hole, the intermediate portion forms the slot, and the distal portion is connected to the tie rod.

10. The vehicle of claim 9, wherein the pivot is a first bolt connected with the hole and the connector member is a second bolt.

11. The vehicle of claim 10, further comprising a sleeve disposed between the steer arm and the first bolt.

12. The vehicle of claim 8, wherein an angular position of the steer arm with respect to the knuckle is selectively adjustable over a predetermined range of angular positions.

13. The vehicle of claim 12, wherein one of the knuckle and the steer arm has a scale for determining the angular position of the steer arm with respect to the knuckle.

14. The vehicle of claim 13, wherein the scale is a vernier scale.

* * * * *